United States Patent
Hung et al.

(10) Patent No.: US 8,466,840 B2
(45) Date of Patent: Jun. 18, 2013

(54) WIRELESS TRANSMISSION DEVICE AND COMPUTER SYSTEM USING THE SAME

(75) Inventors: Guo-Ying Hung, Taipei (TW); Kei-Zan Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 321 days.

(21) Appl. No.: 12/938,382

(22) Filed: Nov. 3, 2010

(65) Prior Publication Data
US 2011/0102271 A1 May 5, 2011

Related U.S. Application Data

(60) Provisional application No. 61/257,824, filed on Nov. 3, 2009.

(51) Int. Cl.
*H01Q 1/24* (2006.01)
(52) U.S. Cl.
USPC .......................................................... 343/702
(58) Field of Classification Search
USPC .......................................................... 343/702
See application file for complete search history.

(56) References Cited

U.S. PATENT DOCUMENTS

| 6,833,818 | B2 * | 12/2004 | Kim et al. | 343/702 |
| 6,879,293 | B2 * | 4/2005 | Sato | 343/702 |
| 7,372,406 | B2 * | 5/2008 | Shiotsu et al. | 343/700 MS |

FOREIGN PATENT DOCUMENTS

CN 1326241 12/2001

* cited by examiner

*Primary Examiner* — Hoang V Nguyen
(74) *Attorney, Agent, or Firm* — Jianq Chyun IP Office

(57) ABSTRACT

A wireless transmission device and a computer system using the same are provided. The wireless transmission device is adapted to a computer system having a first housing and a second housing, a display is disposed in the first housing, and a motherboard is disposed in the second housing. The wireless transmission device includes a first antenna and a signal processing module. The first antenna is disposed in the side edge of the first housing opposite to the second housing and the signal processing module is disposed in the second housing. The signal processing module is connected with the first antenna via a cable, and it also has a second antenna, so as to process a wireless signal transmitted by the first antenna and the second antenna.

12 Claims, 6 Drawing Sheets

WIRELESS TRANSMISSION DEVICE AND COMPUTER SYSTEM USING THE SAME

CROSS-REFERENCE TO RELATED APPLICATION

This application claims the priority benefit of U.S. provisional application Ser. No. 61/257,824, filed on Nov. 3, 2009. The entirety of the above-mentioned patent application is hereby incorporated by reference herein and made a part of specification.

BACKGROUND OF THE INVENTION

1. Field of the Invention

The invention relates to a wireless transmission device and, more particularly, to a computer system using the wireless transmission device.

2. Description of the Related Art

With the development of wireless communication technology, the latest wireless transmission standard develops to institute of electrical and electronics engineers (IEEE) 802.11n. The standard uses the multi-input multi-output (MIMO) technology, and it can improve data throughput and transmission distance of the communication system without increasing the bandwidth and the total transmit power expenditure.

The MIMO technology mainly uses the space freedom provided by several transmission antennas and receiving antennas to improve the spectrum efficiency of the wireless communication system and improve the transmission speed and optimize the communication quality. The computer system usually has two two-way transmission antennas to obtain the 2T2R or 1T2R wireless transmission function.

For example, FIG. 1 is a schematic diagram showing a conventional computer system with the wireless transmission function. A conventional computer system 100 includes a first housing 110 and a second housing 120 pivotally connected to the first housing 110. A display 130 is disposed in the first housing 110, and a motherboard 140 is disposed in the second housing 120. The wireless transmission module 150 may be a half mini card, and it may be connected to a slot of the motherboard 140 via a mini peripheral component interconnect (Mini PCI) connector (not show) to communicate with the motherboard 140. Furthermore, the wireless transmission module 150 also may be connected to cables 160 and 170 via an I-PEX connector (not shown), and connected to antennas 180 and 190 at the first housing 110 via the cables 160 and 170. Thus, the wireless transmission module 150 implements the 2T2R or 1T2R wireless signal transmission via the antennas 180 and 190 to provide the wireless transmission function needed by the computer system 100.

However, the structure of two two-way transmission antennas not only has higher cost due to the additional antennas, but also occupies the space for disposing the hardware of the computer system. The circuit board (including two connectors of the antennas) of the wireless transmission module is larger, and it is not favorable to a computer system pursuing a light and small outlook.

Besides the structure of two external antennas, the conventional computer system also uses a structure of single external antenna. FIG. 2 is a schematic diagram showing another conventional computer system with the wireless transmission function. In FIG. 2, a conventional computer system 200 includes a first housing 210 having a display 230 and a second housing 220 having a motherboard 240. A wireless transmission module 250 is disposed in the second housing 220, and connected to an antenna 270 at the first housing 210 via a cable 260. The wireless transmission module 250 implements the 1T1R wireless signal transmission via the antenna 270 to provide the wireless transmission function needed by the computer system 200.

Although the IEEE 802.11n standard supports the 1T1R wireless signal transmission, if only one antenna is disposed in the computer system, some access points (AP) using the IEEE 802.11n standard cannot demodulate the signal transmitted by single antenna, resulting in a great decreasement of the data transmission speed.

BRIEF SUMMARY OF THE INVENTION

A wireless transmission device and a computer system using the same is provided to reduce the configuration space occupied by an antenna.

The wireless transmission device adapted to a computer system is provided with a first housing and a second housing. a display is disposed in the first housing includes, and a motherboard is disposed in the second housing includes a motherboard. The wireless transmission device includes a first antenna and a signal processing module. The first antenna is disposed in the side edge of the first housing opposite to the second housing. The signal processing module is disposed in the second housing and connected to the first antenna via a cable. A second antenna is disposed in the signal processing module to process a wireless signal transmitted by the first antenna and the second antenna.

In an embodiment, the second antenna is disposed in the side edge or a corner of the second housing.

In an embodiment, the second antenna keeps a distance from the motherboard and the side edge of the second housing.

In an embodiment, the second antenna is a printed antenna printed on the circuit board of the signal processing module, and the printed antenna is a planar inverted-L antenna or a planar inverted-F antenna.

In an embodiment, the cable is a radio frequency cable (RF cable), and the signal processing module further includes an RF connector to connect the RF cable to transmit the wireless signal.

In an embodiment, the signal processing module further includes a data connector which connects the motherboard to transmit the processed wireless signal to the motherboard, and receive a data signal transmitted by the motherboard. The data connector is a peripheral component interconnect (PCI) connector or a universal serial bus (USB) connector.

A computer system including a first housing, a second housing, a display, a motherboard and a wireless transmission device is provided. The second housing is pivotally connected to the first housing, the display is disposed in the first housing, and the motherboard is disposed in the second housing. The wireless transmission device includes a first antenna and a signal processing module. The first antenna is disposed in the side edge of the first housing opposite to the second housing. The signal processing module is disposed in the second housing and connected to the first antenna via a cable. A second antenna is disposed in the signal processing module to process a wireless signal transmitted by the first antenna and the second antenna.

As stated above, the wireless transmission device and the computer system using the same have a printed antenna disposed in the circuit board of the signal processing module of the wireless transmission device, and the printed antenna is disposed in the side edge or the corner of the housing of the computer system properly to save the hardware configuration space and implement the 2T2R or 1T2R wireless transmission.

These and other features, the discloses will become better understood with regard to the following description, appended claims, and accompanying drawings.

DETAILED DESCRIPTION OF THE EMBODIMENTS

The wireless transmission device at least has two antennas and at least supports the 1T2R wireless signal transmission to conform to the IEEE 802.11n standard. In an embodiment, one of the two conventional external antennas is changed to a printed antenna printed on a signal processing circuit board, and the printed antenna is configured at the side edge of a housing of the computer system. Thus, the 1T2R wireless signal transmission or more is implemented without occupying more hardware space.

Figure 1:
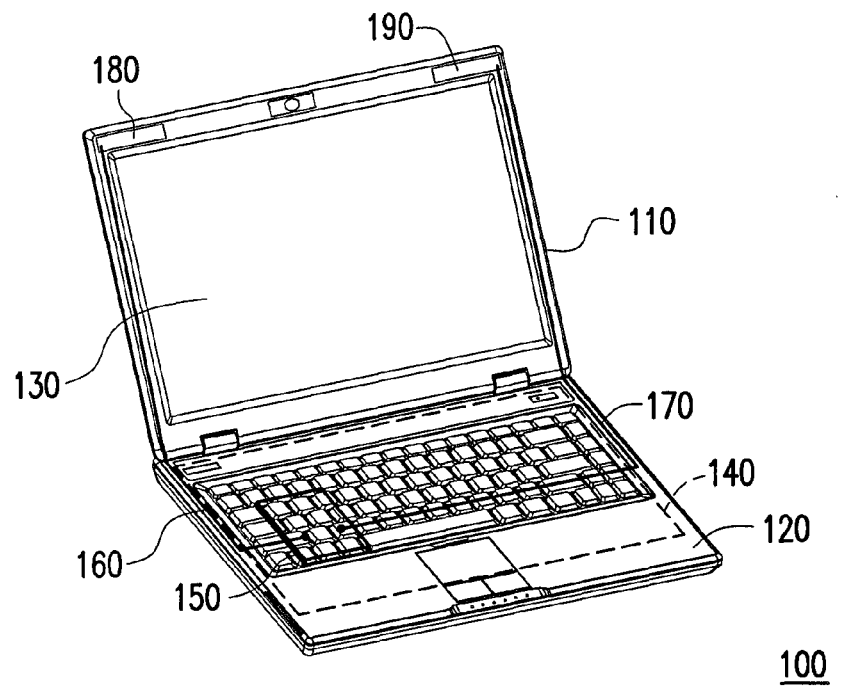
FIG. 1 is a schematic diagram showing a conventional computer system with a wireless transmission function.
Figure 2:
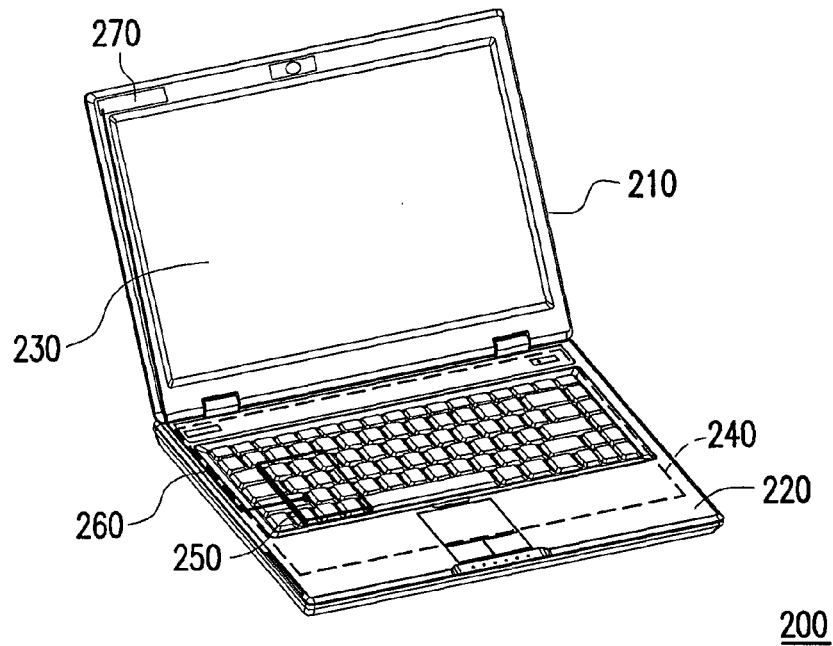
FIG. 2 is a schematic diagram showing another conventional computer system with a wireless transmission function.
Figure 3:
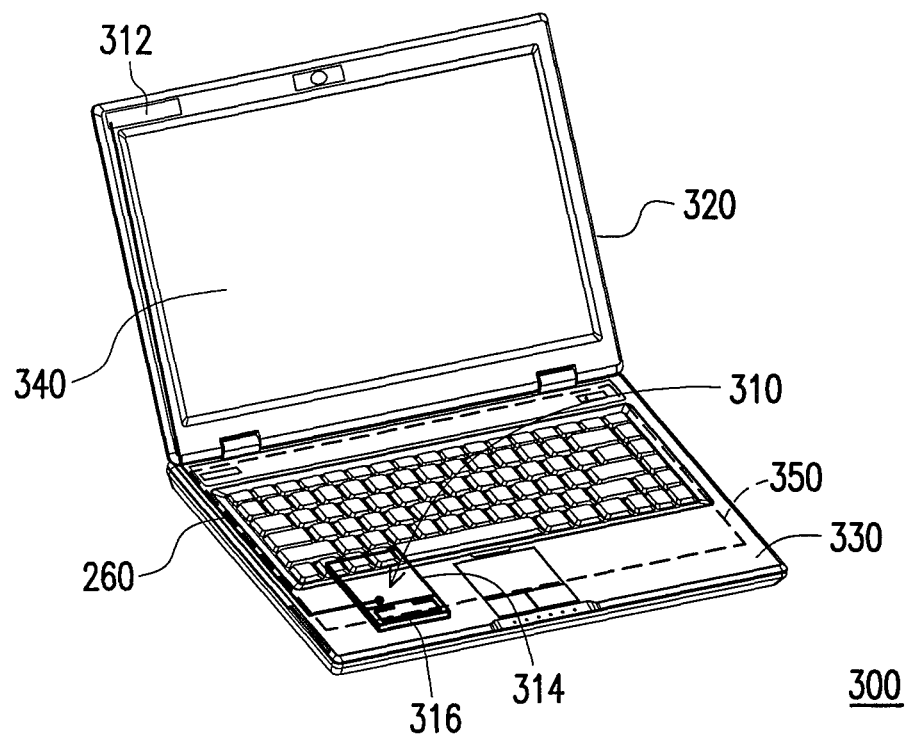
FIG. 3 is a schematic diagram showing a wireless transmission device in an embodiment.

FIG. 3 is a schematic diagram showing a wireless transmission device in an embodiment. In FIG. 3, a wireless transmission device 310 in the embodiment is disposed in a computer system 300 to provide a wireless transmission function. In detail, the computer system 300 includes a first housing 320 and a second housing 330 pivotally connected to the first housing 320. A display 340 such as a liquid crystal display (LCD) or other flat displays is disposed in the first housing 320. The second housing 330 has a motherboard 350 therein. A keyboard, a touch pad, a connector, buttons or other common hardware elements in the computer system also may be disposed in the second housing 330. However, it is not limited thereto.

The wireless transmission device 310 in the embodiment includes a first antenna 312 and a signal processing module 314. The first antenna 312 is disposed in the top side edge of the first housing 320, which is the side edge of the first housing 320 above the display 340 opposite to the second housing 330. The first antenna 312 can provide better wireless signal transmission when the first housing 320 is lifted from the second housing 330 and rotates to the above of the second housing 330.

The signal processing module 314 is disposed in the second housing 330. It connects to the first antenna 312 of the first housing 320 via a cable 360, and receives or transmits the wireless signal via the first antenna 312. In detail, a radio frequency (RF) connector such as an I-PEX connector is disposed in the signal processing module 314. The RF connector is used for connecting the signal processing module 314 to a RF cable and connects to the first antenna 312 of the first housing 320 via the RF cable to receive or transmit the wireless signal.

Furthermore, the signal processing module 314 also has a second antenna 316. The second antenna 316 is a printed antenna printed on the circuit board of the signal processing module 314, and thus the signal processing module 314 can use the second antenna 316 to receive or transmit the wireless signal without additional cables or connectors. The printed antenna above may be a planar inverted-L antenna or a planar inverted-F antenna. However, it is not limited thereto.

Moreover, the signal processing module 314 also has a data connector. The data connector is used for connecting the signal processing module 314 to the motherboard to transmit the processed wireless signal to the motherboard and receive the data signal transmitted by the motherboard. The data connector may be a PCI connector or a USB connector. However, it is not limited thereto.

Figure 4:
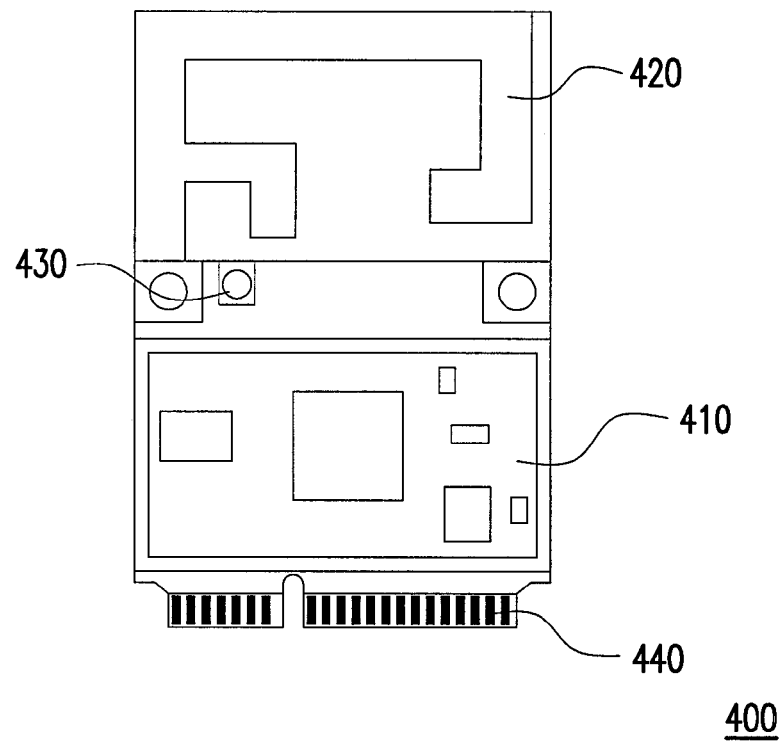
FIG. 4 is a schematic diagram showing a signal processing module in a first embodiment.
Figure 5:
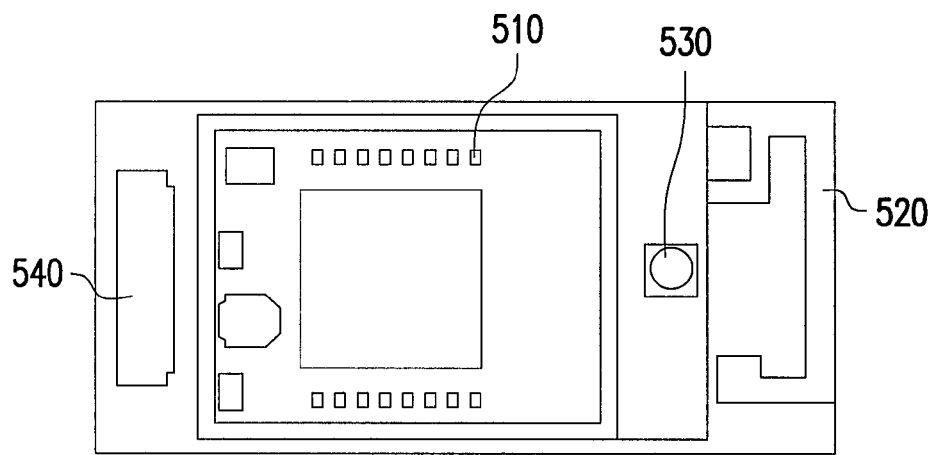
FIG. 5 is a schematic diagram showing a signal processing module in a second embodiment.

For example, FIG. 4 and FIG. 5 are schematic diagrams showing the signal processing modules in two embodiments, respectively. A signal processing module 400 in FIG. 4 is a half mini card and includes an I-PEX connector 430 and a mini PCI connector 440 except for a signal processing circuit 410 and a planar inverted-F antenna 420. The I-PEX connector 430 is connected to the RF cable, and the PCI connector 440 is inserted to a mini PCI socket of the motherboard to enable the signal processing module 400 to communicate with the motherboard.

On the other hand, the signal processing module 500 in FIG. 5 includes a signal processing circuit 510, a planar inverted-F antenna 520, an I-PEX connector 530 and an Ultra-USB connector 540. The I-PEX connector 530 is connected to the RF cable, and the Ultra-USB connector 540 may be connected to a USB connector of the motherboard to enable the signal processing module 500 to communicate with the motherboard.

The structure of the wireless transmission device above can save the hardware configuration space occupied by an external antenna (including a cable and a connector), reduce the size of the wireless transmission device largely, and also can implement wireless signal transmission function more than the 1T2R.

To avoid being affected by the metal housing and optimize the effect of the wireless signal transmission, in one embodiment, the signal processing module is disposed in the side edge of the second housing, and the printed antenna is disposed in an side edge of the signal processing module. The printed antenna is arranged near the side edge and keeps a distance from the side edge to improve the signal receiving effect. Moreover, in another embodiment, the signal processing module also may be disposed in an side edge or a corner of the second housing opposite to the first housing, and the printed antenna is arranged near the side edge or the corner and keeps a distance from the side edge or the corner to improve the receiving effect.

Figure 6:
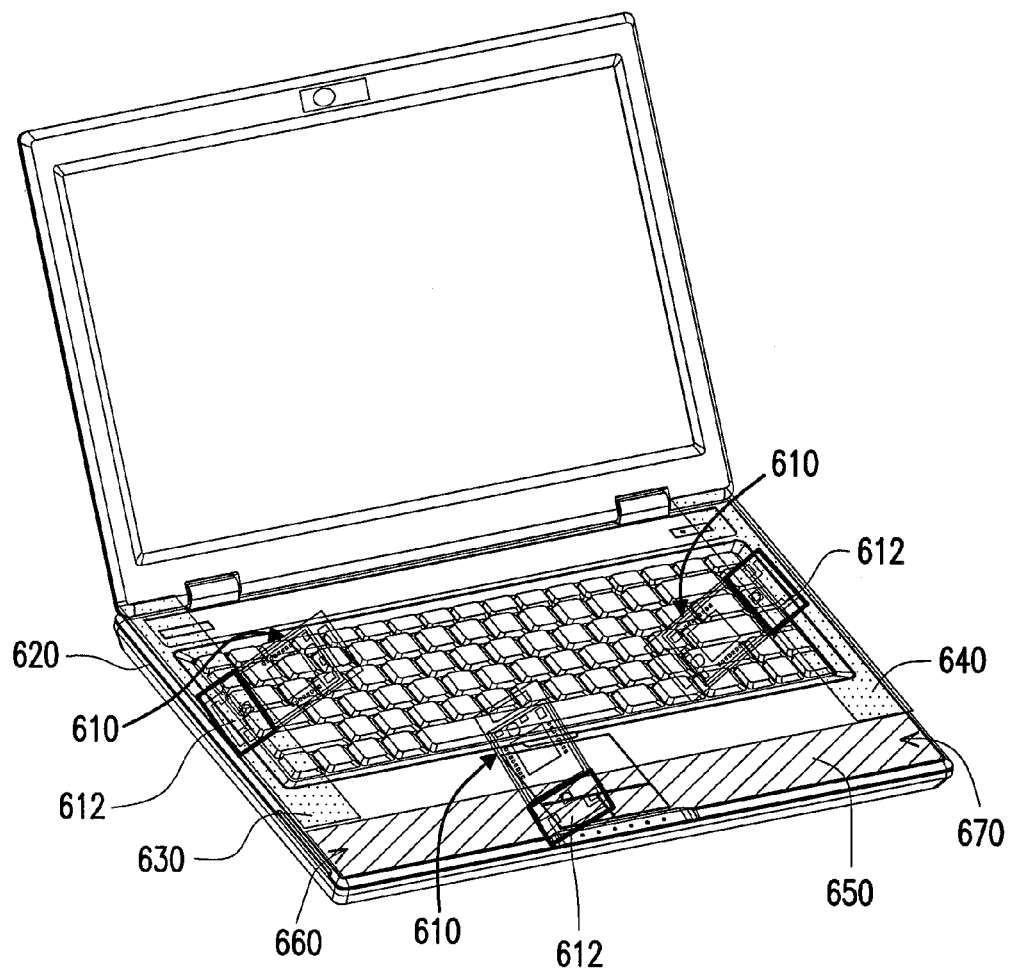
FIG. 6 is a schematic diagram showing a configuration of a signal processing module in an embodiment.

For example, FIG. 6 is a schematic diagram showing a configuration of the signal processing module in an embodiment. In FIG. 6, the signal processing module 610 is preferably disposed in the side edge of the housing 620 to make the printed antenna 612 locate in the area 0 mm to 40 mm away from the housing 620, such as a left area 630, a right area 640 or a bottom area 650 shown in FIG. 6, to get a better receiving effect. Moreover, the signal processing module 610 also may be disposed in the corner of the housing 620 to make the printed antenna 612 locate in a left bottom area 660 or a right bottom area 670 of a housing 620 to get a better receiving effect. In the configuration of the printed antenna 612, it is better to leave a metal free space with a 5 mm to 10 mm width and a 3 mm to 6 mm height around the printed antenna 612 to ensure that the signal receiving and transmission of the printed antenna 612 does not affected by the metal, and gets the best receiving effect.

With the structure of the above wireless transmission device, without disposing an external antenna additionally, it can provide better effect of wireless signal receiving and transmission, and solve the problem that the data throughput decreases or the antenna signal cannot be demodulated.

Figure 7A:
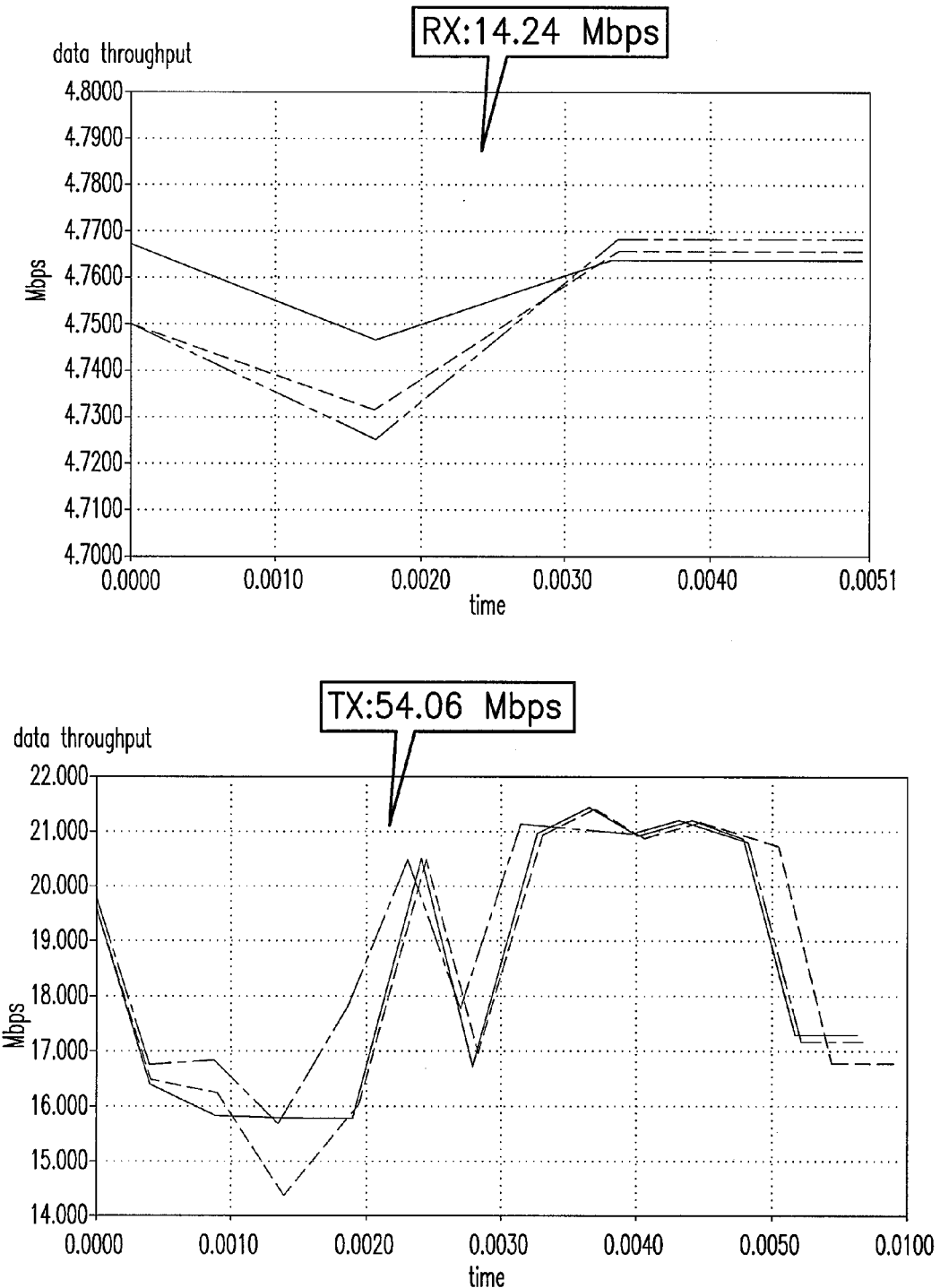
FIG. 7 (a) and FIG. 7 (b) are schematic diagrams showing the comparison of the data throughput of a conventional wireless transmission device and a wireless transmission device in an embodiment.
Figure 7B:
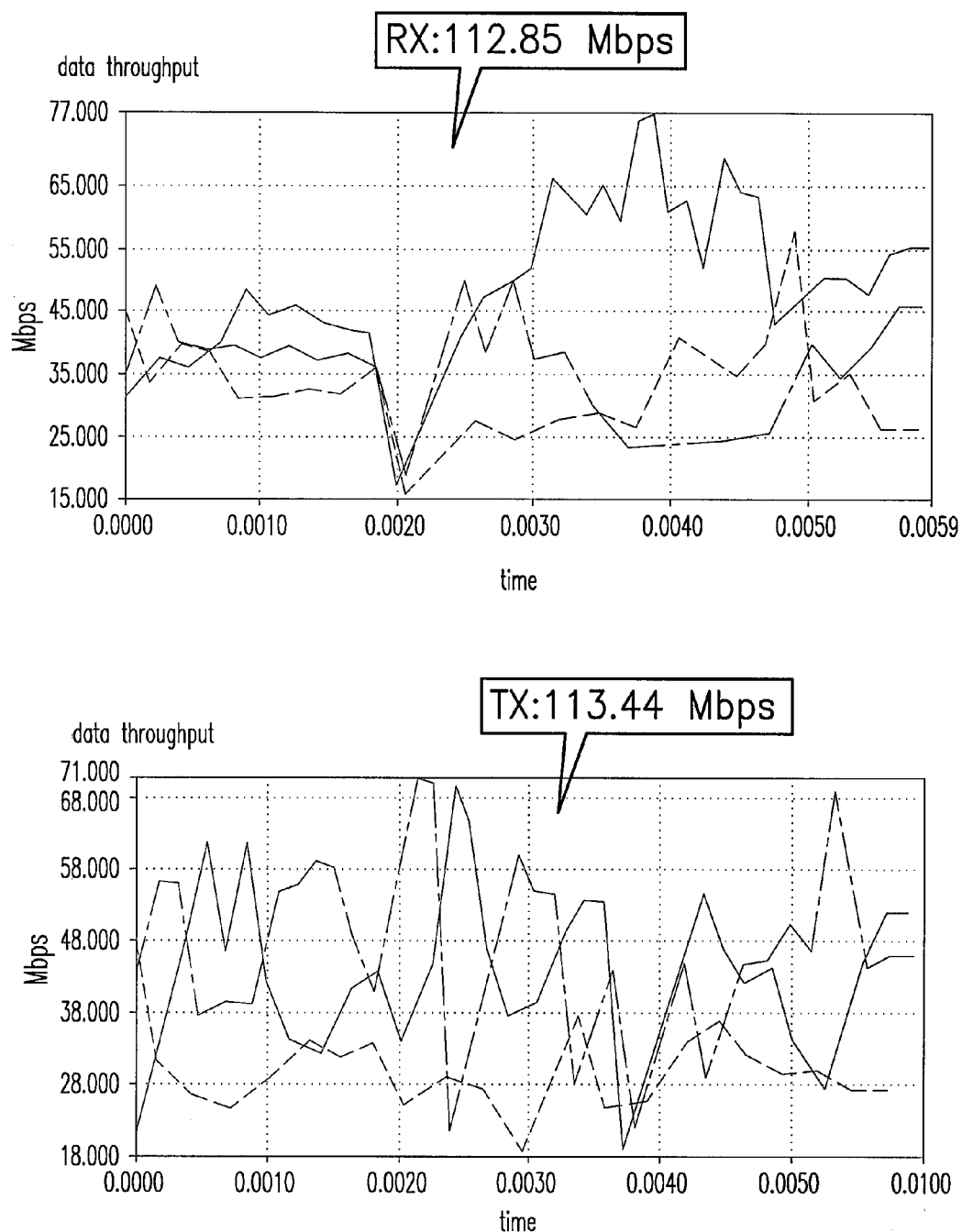

In detail, FIG. 7 (a) and FIG. 7 (b) are schematic diagrams showing the comparison of the data throughput of a conventional wireless transmission device and a wireless transmission device in an embodiment. In the embodiment, common monitoring software is used to measure the receiving (Rx) and transmission (Tx) data throughput of the wireless transmission device with a conventional antenna structure and that with the antenna structure in an embodiment. FIG. 7(a) shows the measured data throughput using the single antenna structure to receive and transmit the wireless signal. FIG. 7(b) shows the measured data throughput using the structure of the single external antenna and the printed antenna. As shown in FIG. 7(a) and FIG. 7(b), the antenna structure improves the receiving (Rx) and transmission (Tx) data throughput of the wireless transmission device greatly.

In sum, the wireless transmission device and the computer system using the same uses a printed antenna instead of an external antenna, and thus, it reduces the hardware configuration space occupied by the external antenna and solve the problem that the data throughput decreases or the antenna signal cannot be demodulated. Moreover, the printed antenna is disposed in a proper position in the computer system. Thus, a better wireless signal receiving effect is achieved.

Although the disclosure has been described in considerable detail with reference to certain preferred embodiments thereof, it is not for limiting the scope. Persons having ordinary skill in the art may make various modifications and changes without departing from the scope. Therefore, the scope of the appended claims should not be limited to the description of the preferred embodiments described above.

What is claimed is:

1. A wireless transmission device adapted to a computer system with a first housing and a second housing, wherein a display is disposed in the first housing, and a motherboard is disposed in the second housing, comprising:
    a first antenna disposed in the first housing opposite to a side edge of the second housing; and
    a signal processing module disposed in the second housing and connected with the first antenna via a cable,
    wherein a second antenna is disposed on the signal processing module and in the side edge or a corner of the second housing and keeps a distance from the motherboard and the side edge of the second housing, and the signal processing module is used to process a wireless signal transmitted by the first antenna and the second antenna.

2. The wireless transmission device according to claim 1, wherein the second antenna is a printed antenna printed on a circuit board of the signal processing module.

3. The wireless transmission device according to claim 2, wherein the printed antenna includes a planar inverted-L antenna or a planar inverted-F antenna.

4. The wireless transmission device according to claim 1, wherein the cable is a radio frequency (RF) cable, and the signal processing module further comprises:
    a RF connector connected to the RF cable to transmit the wireless signal.

5. The wireless transmission device according to claim 1, wherein the signal processing module further comprises:
    a data connector connected to the motherboard to transmit the processed wireless signal to the motherboard and receive a data signal transmitted by the motherboard.

6. The wireless transmission device according to claim 5, wherein the data connector includes a peripheral component interconnect (PCI) connector or a universal serial bus (USB) connector.

7. A computer system, comprising:
    a first housing;
    a second housing pivotally connected to the first housing;
    a display disposed in the first housing;
    a motherboard disposed in the second housing; and
    a wireless transmission device, including:
        a first antenna disposed in an side edge of the first housing opposite to the second housing; and
        a signal processing module disposed in the second housing and connected with the first antenna via a cable,
        wherein a second antenna is disposed in the signal processing module and in the side edge or a corner of the second housing and keeps a distance from the motherboard and the side edge of the second housing to process a wireless signal transmitted by the first antenna and the second antenna.

8. The computer system according to claim 7, wherein the second antenna is a printed antenna printed on a circuit board of the signal processing module.

9. The computer system according to claim 7, wherein the printed antenna includes a planar inverted-L antenna or a planar inverted-F antenna.

10. The computer system according to claim 7, wherein the cable is a RF cable, and the signal processing module further comprises:
    a RF connector connected to the RF cable to transmit the wireless signal.

11. The computer system according to claim 7, wherein the signal processing module further comprises:
    an data connector connected to the motherboard to transmit the processed wireless signal to the motherboard and receive an data signal transmitted by the motherboard.

12. The computer system according to claim 11, wherein the data connector includes a PCI connector or a USB connector.

* * * * *